(No Model.)
A. E. HAMMARSTROM.
PITCHFORK.
No. 514,069. Patented Feb. 6, 1894.
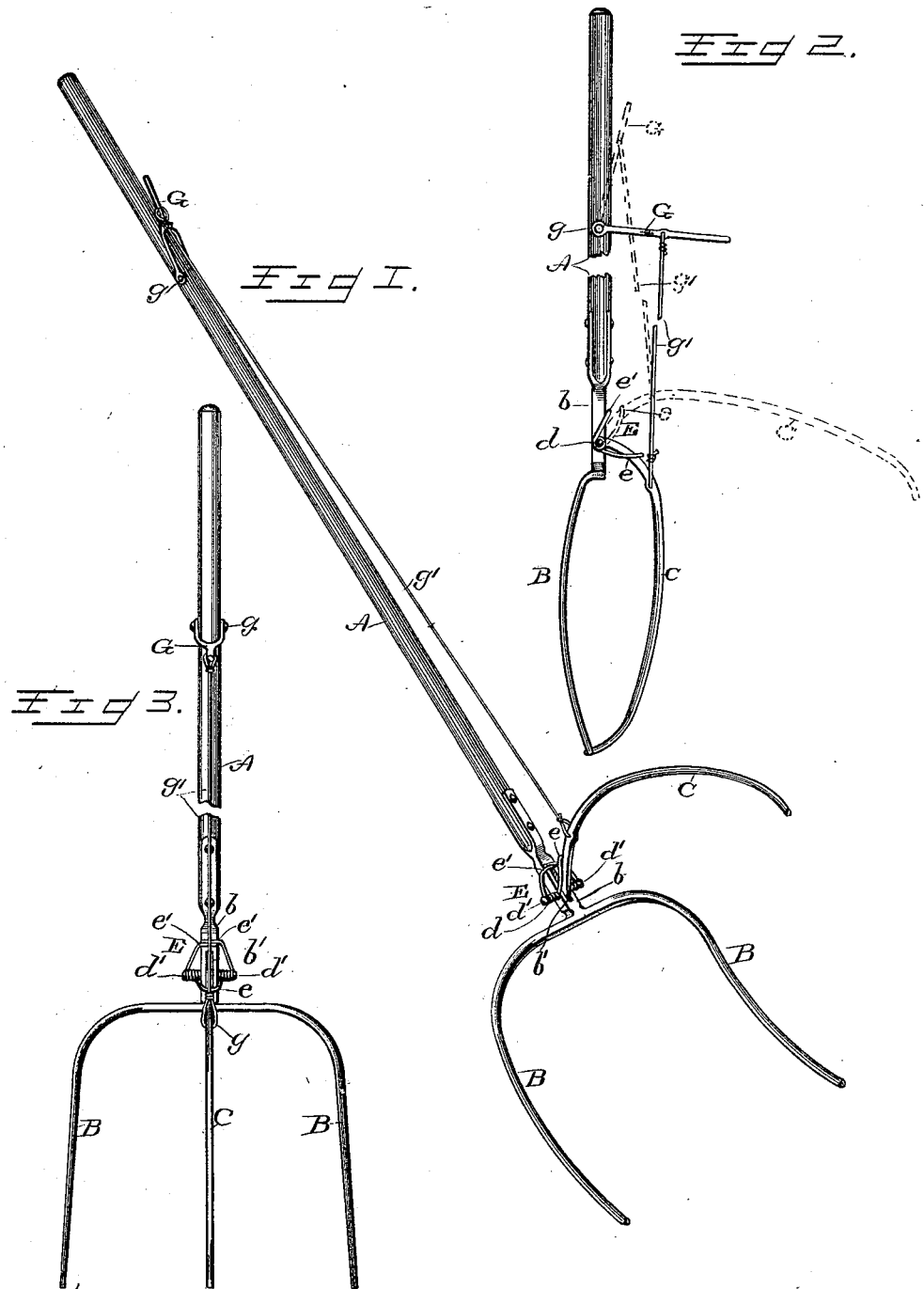
Witnesses:
Arthur F Durand
H. M. Richards
Inventor:
A. E. Hammarstrom,
By W. B. Richards
Atty.

UNITED STATES PATENT OFFICE.

ANDREW E. HAMMARSTROM, OF KNOXVILLE, ASSIGNOR TO WILLIAM H. McELWAIN, OF APPLETON, ILLINOIS.

PITCHFORK.

SPECIFICATION forming part of Letters Patent No. 514,069, dated February 6, 1894.

Application filed January 6, 1893. Serial No. 457,451. (No model.)

*To all whom it may concern:*

Be it known that I, ANDREW E. HAMMARSTROM, a citizen of the United States, residing at Knoxville, in the county of Knox and State of Illinois, have invented certain new and useful Improvements in Pitchforks, of which the following is a specification.

My invention relates to improvements in pitchforks.

The main object of my invention is to furnish pitchforks for handling corn stalk fodder, either with or without the ears of corn thereon, and for handling other analogous fodder and other material having large, coarse culms or stalks, which is with difficulty retained on ordinary pitchforks, especially when the fork is used for throwing such fodder or other material by hand onto wagons or other vehicles for loading; and to the end of furnishing pitchforks which will, while simple in construction securely and without aid by the operator retain such material thereon when elevated for loading onto a wagon or for other purposes.

My invention consists in a pitchfork to which is hinged a swinging tine which is operated by a spring to swing it toward the other fork tines, for clasping the fodder between itself and said fork tines, and which is operated to swing it in an opposite direction by a hand lever which is hinged to the fork handle at a location convenient for the operator to grasp and hold with the fork handle while inserting the fork tines into the fodder.

The invention further consists in constructions and combinations hereinafter described, and set forth in the claims hereto appended.

A pitchfork embodying my invention is delineated in the accompanying drawings, in which—

Figure 1 is a perspective, showing the swinging tine in its turned back position; Fig. 2, a side elevation, showing the swinging tine closed upon the other tines by full lines, and turned back therefrom in dot lines; Fig. 3, a plan of the fork, with the parts in same relative positions as shown by full lines at Fig. 2.

The same reference letter indicates the same part in the different figures of the drawings.

The handle A, tines B and shank $b$ are parts of an ordinary fork, except that the shank $b$ has a slot $b'$ therethrough, for purposes hereinafter described. For the uses for which my fork is designed, it is preferable to have the tines somewhat longer than in ordinary pitchforks, somewhat heavier, and with blunter points, so that they will by their increased length support a load which lies only on them and through which they do not pass, so that by their increased weight or cross sectional area they will carry a heavy load with a long tine, and so that with their rounded and blunt pointed ends they can be thrust into a large bundle or heap of cornstalks or bundle of other similar coarse material without passing into or through the large, coarse individual stalks or culms of which such bundle or heap is composed. There may also be two or more tines B, as preferred.

The swinging tine C is preferably of about the curved form shown, so that it will extend over and partly around a bunch of cornstalks or other material held between it and the tines B. But one tine C is shown, but more may be used if preferred. One end of the tine C is located in and fits snugly against the side walls of the slot $b'$, and the tine is thereby aligned properly in its swinging movements, and a bolt $d$ passes through it as a pivot bolt, and through the sides of the shank $b$. The ends $d'$ of the bolt $d$ are extended beyond the sides of the shank $b$.

E is a spring, the midlength portion $e$ of which is bent into U-shaped form, and rests upon the tine C a short distance from its hinged end. The two end parts of the spring E pass from the U-shaped part $e$, one end part to each projecting end $d'$ of the bolt $d$. Each end part of the spring is then coiled spirally around the adjacent end $d'$ of the bolt $d$, and thence the spring ends $e'$ pass to and each across the shank $b$ on which they rest as shown, and may or may not be fixed or united to each other, as preferred. The spring E is coiled so as to exert a force which tends to force the tine C into the position shown by full lines at Fig. 2. One end of the short hand lever G is bifurcated and pivoted or hinged by a bolt $g$ to the handle A where it will be convenient to one hand of the person using the pitchfork. A wire or cord $g'$ connects the lever G and the tine C, a short distance from their hinged ends, in such manner that by turning the hand lever G into the position shown by dotted lines at Fig. 2, the tine C will be swung back into the position shown by dotted lines at same figure.

While the lever G is held in the position shown, by full lines at Fig. 1 and dot lines at Fig. 2 by one hand of the operator, which hand is at the same time grasping the fork handle and assisting in manipulating the fork, the tine C being as it then is, drawn backwardly out of the way, the tines B may be inserted into a bunch of corn fodder as it stands in a shock, or as it may be lying on the ground, but in such manner as to pass beneath the quantity of stalks to be lifted. The lever G is then released and the spring E forces the tine C over into or approximately into the full line position shown at Figs. 1 and 2, and thereby onto the stalks, contained between the tines C and B, said spring having sufficient strength or tension to force down the tine or tines C and hold the stalks, without other aid, on the tines B while they are elevated to throw them on a load by an ordinary movement or operation of the fork. When the stalks are elevated, if the fork is turned to throw the weight of the stalks onto the tine C it will yield backwardly and permit their escape from the fork, or the tine C may be thrown backwardly as hereinbefore described to release them in an evident manner. It will thus be seen that my fork can be used to load such large, lengthy, coarse stalk material as corn stalks, which do not hang together as does hay, straw or like material, and which for that reason and on account of its length cannot be successfully handled with an ordinary fork, especially to pitch it onto a wagon.

Having thus described my invention, what I claim as new, and desire to secure by Letters Patent, is—

1. In a pitch-fork, in combination, substantially as hereinbefore described, with a handle and tines fixed thereto, a swinging tine hinged in a slot in the shank of said fixed tines, a bolt $d$ with extended ends $d'$, a spring having its midlength portion of U-shaped form, its end portions coiled on the ends $d'$ of the rod $d$, and bent to rest upon the shank $b$, and a hand lever pivoted to the fork handle and connected by a rod or cord with the swinging tine.

2. In a pitchfork, the combination substantially as hereinbefore described, with a pitchfork of substantially ordinary construction, having tines and a handle rigidly secured thereto, of a swinging tine or tines hinged at the upper end of the rigid tines, a spring which forces the swinging tine toward the rigid tines, a link rod and a lever which act merely to draw the swinging tine backwardly against the force action of the spring, all constructed so that an operator after releasing the swinging tine to the action of the spring can use both hands at any point or points along the fork handle for manipulating the load.

3. In a pitchfork the combination substantially as hereinbefore described, with an ordinary pitchfork having tines and a handle rigidly fixed to each other, of a swinging tine or tines hinged at the upper end of the rigid tines, a spring which forces the swinging tine toward the rigid tines, a link and a lever, the link connecting the lever and the swinging tine, and the lever hinged to the handle to fold back on said handle for the purpose specified, and to swing outwardly therefrom when released by the hand and operated on by the spring.

In testimony whereof I affix my signature in presence of two witnesses.

ANDREW E. HAMMARSTROM.

Witnesses:
 JOSIAH TILDEN,
 MIRON RHODES.